(12) United States Patent
Colmagro et al.

(10) Patent No.: US 11,987,029 B2
(45) Date of Patent: May 21, 2024

(54) METHOD FOR MANUFACTURING A CELLULAR STRUCTURE OBTAINED FROM BENT STRIPS OF MATERIAL, AND CELLULAR STRUCTURE THUS OBTAINED

(71) Applicant: Airbus Operations SAS, Toulouse (FR)

(72) Inventors: Jérôme Colmagro, Toulouse (FR); Charles Cariou, Toulouse (FR); Florian Ravise, Toulouse (FR); Maxime Gauthier, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 2 days.

(21) Appl. No.: 17/824,102

(22) Filed: May 25, 2022

(65) Prior Publication Data
US 2022/0379579 A1 Dec. 1, 2022

(30) Foreign Application Priority Data
May 27, 2021 (FR) ...................................... 2105509

(51) Int. Cl.
*B32B 37/14* (2006.01)
*B32B 3/12* (2006.01)
(Continued)

(52) U.S. Cl.
CPC .................. *B32B 3/12* (2013.01); *B32B 3/20* (2013.01); *B32B 37/146* (2013.01);
(Continued)

(58) Field of Classification Search
None
See application file for complete search history.

(56) References Cited

U.S. PATENT DOCUMENTS

| 3,523,853 A | * | 8/1970 | Thomas | E04C 2/365 |
| | | | | 425/305.1 |
| 3,678,558 A | * | 7/1972 | Fredericks | B31D 3/02 |
| | | | | 228/173.6 |

(Continued)

FOREIGN PATENT DOCUMENTS

| EP | 3650332 A1 | 5/2020 |
| FR | 3060829 A1 | 6/2018 |
| FR | 3098143 A1 | 1/2021 |

OTHER PUBLICATIONS

French Search Report; priority document.

*Primary Examiner* — Christopher T Schatz
(74) *Attorney, Agent, or Firm* — Greer, Burns & Crain, Ltd.

(57) ABSTRACT

A method for manufacturing a cellular structure having first and second faces, rows of cells each alternatingly having first cells, which are open in the direction of the first face, second cells, which are open in the direction of the second face, and also third cells formed between each row of cells, each row of cells comprising first and second strips of material placed against one another. The first and second strips of material are shaped by bending. By contrast to plastic deformation, shaping by bending makes it possible to expand the choice of materials and thicknesses for the first and second strips of material. An advantageous cellular structure is thus obtained as well as an acoustic absorption coating comprising such a cellular structure.

8 Claims, 10 Drawing Sheets

(51) Int. Cl.
*B32B 3/20* (2006.01)
*B32B 38/00* (2006.01)
*B64D 29/00* (2006.01)

(52) U.S. Cl.
CPC ...... *B32B 38/0004* (2013.01); *B32B 38/0012* (2013.01); *B32B 2250/03* (2013.01); *B32B 2305/024* (2013.01); *B32B 2307/102* (2013.01); *B32B 2605/18* (2013.01); *B64D 29/00* (2013.01)

(56) References Cited

U.S. PATENT DOCUMENTS

2018/0174568 A1 6/2018 Porte et al.
2020/0143786 A1 5/2020 Ravise et al.

* cited by examiner

METHOD FOR MANUFACTURING A CELLULAR STRUCTURE OBTAINED FROM BENT STRIPS OF MATERIAL, AND CELLULAR STRUCTURE THUS OBTAINED

CROSS-REFERENCES TO RELATED APPLICATIONS

This application claims the benefit of the French patent application No. 2105509 filed on May 27, 2021, the entire disclosures of which are incorporated herein by way of reference.

FIELD OF THE INVENTION

The present application relates to a method for manufacturing a cellular structure obtained from bent strips of material, and to a cellular structure thus obtained. More broadly, the present application relates to an acoustic absorption coating with which an aircraft is equipped.

BACKGROUND OF THE INVENTION

According to one embodiment, an acoustic absorption coating comprises a porous layer in contact with a medium in which sound waves propagate, a cellular structure, and a reflective layer.

According to one simplified embodiment, the cellular structure of honeycomb type comprises a plurality of identical cells of hexagonal cross section that are next to one another. This type of cellular structure is suitable for certain frequency ranges, more particularly high frequencies. For low frequencies, it is necessary to provide large-volume cells, this leading to an increase in the thickness of the cellular structure. However, the acoustic absorption coating must be as thin as possible.

The document FR-3.098.143 proposes a specific cellular structure for increasing the volume of the cells without increasing the thickness of the cellular structure. As is illustrated in FIGS. 1 and 2, such a cellular structure comprises multiple rows of cells 10, 10' each alternatingly having first cells 12, which are open in the direction of a first face intended to be held against the porous layer and which are closed in the direction of a second face intended to be held against the reflective layer, and second cells 14, which are closed in the direction of the first face and which are open in the direction of the second face, each first cell 12 being in communication with a second cell 14 via a duct 16 positioned close to the second face. In this way, the volume of a cell corresponds to the sum of the volumes of a first cell 12, a second cell 14 and a duct 16.

The rows of cells 10, 10' are all identical and juxtaposed with one another in an offset manner, the first cells of a first row being placed against the second cells of a second row juxtaposed with the first.

According to one embodiment, each row of cells 10, 10' is obtained by joining two strips of material 18, 18'. As is illustrated in FIG. 3, each strip of material 18, 18' alternatingly comprises a first impression 20 corresponding to a half of a first cell 12, a second impression 22 corresponding to a half of a second cell 14, and a channel connecting the first and second impressions 20, 22 and corresponding to one half of a duct 16.

According to one procedure, a method for manufacturing a cellular structure comprises a step of shaping the strips of material 18, 18' so as to obtain the impressions 20, 22 by forging or stamping, using a tool 24, which can be seen in FIG. 3, and a step of assembling the strips of material 18, 18' by welding or adhesive bonding.

The shaping step requires plastic deformation of the material, which causes the material to stretch in certain zones and to crease in others. This plastic deformation limits the choice of materials and thicknesses that are feasible for the strips of material 18, 18'.

The present invention seeks to remedy all or some of the drawbacks of the prior art.

SUMMARY OF THE INVENTION

To that end, a subject of the invention is a method for manufacturing a cellular structure having first and second faces and also rows of cells each alternatingly having first cells, which are open in the direction of the first face, and second cells, which are open in the direction of the second face; the cellular structure likewise comprising, between each row of cells, third cells, which are open in the direction of the first and second faces.

According to the invention, the method for manufacturing a cellular structure comprises a step of shaping first and second strips of material by bending so as to obtain, for each strip of material, first and second recessed shapes and also joining zones separating the first and second recessed shapes, the first and second strips of material being identical; and also a step of assembling the first and second strips of material to form the cellular structure by holding and connecting the joining zones of the first strips of material against the joining zones of the second strips of material, the first and second recessed shapes alternating and being arranged so as to form the first and second cells and also the third cells.

According to the invention, during the step of shaping the first and second strips of material by bending, each first strip of material is shaped by bending to also obtain a first channel and each second strip of material is shaped by bending to also obtain a second channel, the first and second channels forming ducts, each of which connects a pair of first and second cells.

By contrast to plastic deformation, shaping by bending makes it possible to expand the choice of materials and thicknesses for the first and second strips of material. Moreover, since the first and second strips of material are identical, the assembly of the cellular structure is facilitated. This is because the first and second strips of material can easily be rotated and offset to form the first and second cells.

According to another feature, each first and second strip of material comprises main bending lines arranged such that each first and second recessed shape comprises a main face separated from first and second triangular lateral faces, said first and second lateral faces being arranged on either side of the main face, and also secondary bending lines arranged such that each first and second lateral face is separated from a joining zone, the main face being inclined with respect to the joining zones and, during the assembly step, the main faces of each first strip of material being held against and connected to the main faces of a second strip of material.

According to another feature, for each first and second hollow shape, the main and secondary bending lines are symmetrical with respect to a longitudinal median axis equidistant from the joining zones arranged on either side of the first and second recessed shapes.

According to another feature, the first and second channels are positioned in the main faces of the first and second recessed shapes and each comprise bending lines arranged such that each pair of first and second channels forms a duct positioned between two main faces held against one another.

According to another feature, each first and second channel comprises a median bending line and also two oblique bending lines symmetrical with respect to the median bending line and intersecting at the median bending line.

According to another feature, the manufacturing method comprises a step of making a cutout in the main face of each first and second recessed shape of each first and second strip of material in the flat state prior to the step of shaping by bending, each cutout being configured to place a first or second cell and a duct in communication.

According to a first embodiment, each first and second strip of material comprises first and second longitudinal sides, the cutout being offset with respect to the first and second longitudinal sides of the first and second strips of material.

According to a second embodiment, each first and second strip of material comprises first and second longitudinal sides, the cutout intersecting one longitudinal side from among the first and second longitudinal sides of the first and second strips of material.

Another subject of the invention is a cellular structure obtained by said manufacturing method, an acoustic absorption coating comprising a porous layer, a reflective layer, and such a cellular structure interposed between the porous layer and the reflective layer, and also an aircraft comprising at least one such acoustic absorption coating.

More specifically, a subject of the invention is a cellular structure having first and second faces and also rows of cells each alternatingly having first cells, which are open in the direction of the first face, and second cells, which are open in the direction of the second face, the cellular structure likewise comprising, between each row of cells, third cells, which are open in the direction of the first and second faces, each row of cells comprising first and second strips of material placed against one another, each first and second strip of material comprising first and second recessed shapes and also joining zones separating the first and second recessed shapes, the first and second recessed shapes alternating and being arranged so as to form the first and second cells and also the third cells.

According to the invention, the first and second strips of material are identical and shaped by bending.

According to the invention, the cellular structure comprises ducts, each of which connects a pair of first and second cells, each duct comprising a first channel in each first strip of material and also a second channel in each second strip of material.

According to another feature, each first or second recessed shape comprises a main face inclined with respect to the joining zones and also first and second triangular lateral faces arranged on either side of the main face, the main faces of each first strip of material being held against and connected to the main faces of each second strip of material.

According to another feature, the main face of each first and second recessed shape comprises a cutout configured to place a first or second cell and a duct in communication.

BRIEF DESCRIPTION OF THE DRAWINGS

Other features and advantages will emerge from the following description of the invention, which description is given solely by way of example, with reference to the appended drawings in which.

DETAILED DESCRIPTION OF THE PREFERRED EMBODIMENTS

Figure 1:
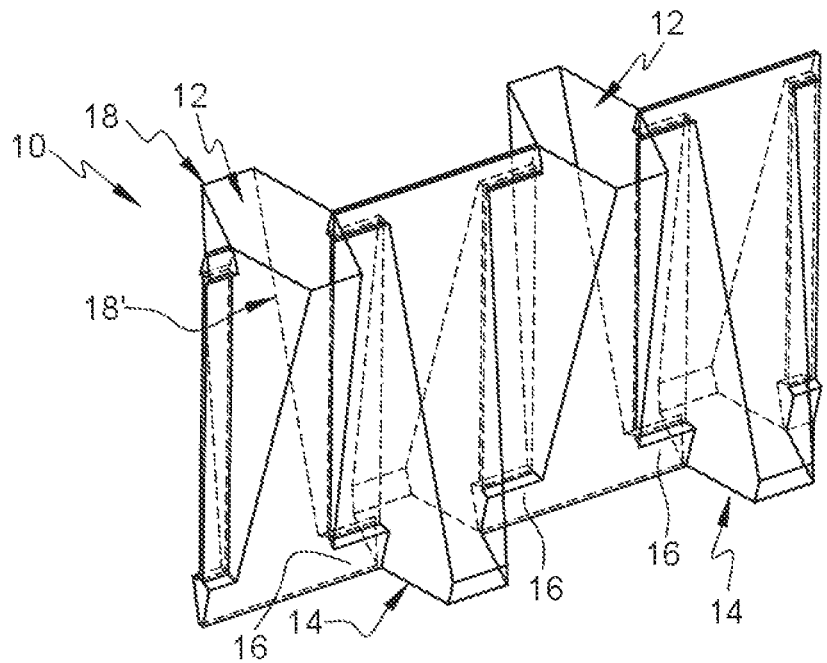
FIG. 1 is a perspective view of a row of cells of a cellular structure illustrating an embodiment of the prior art.
Figure 2:
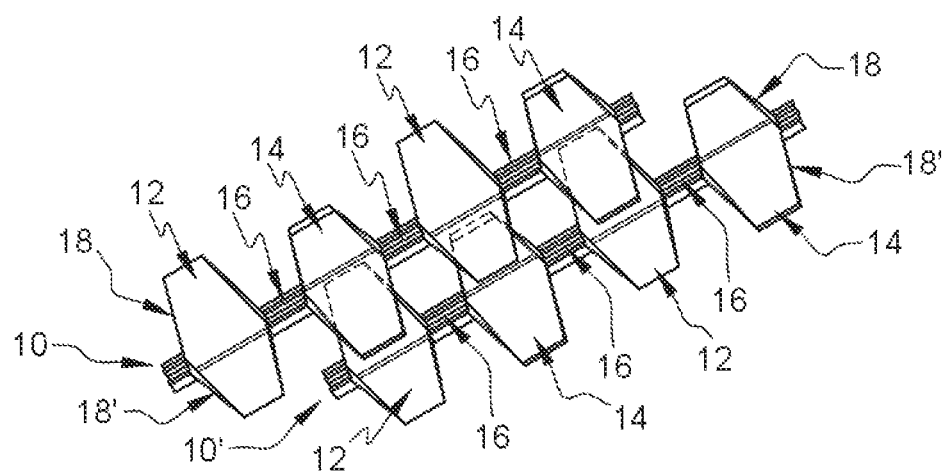
FIG. 2 is a top view of a cellular structure illustrating an embodiment of the prior art.
Figure 3:
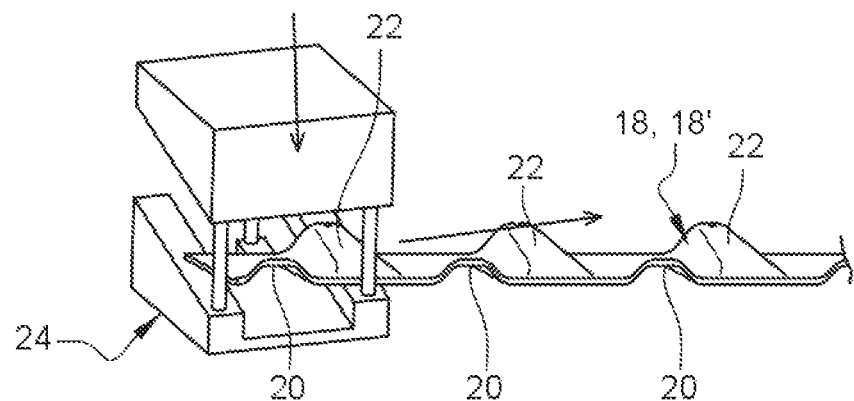
FIG. 3 is a schematic representation of a strip of material shaped according to a procedure of the prior art.
Figure 4:
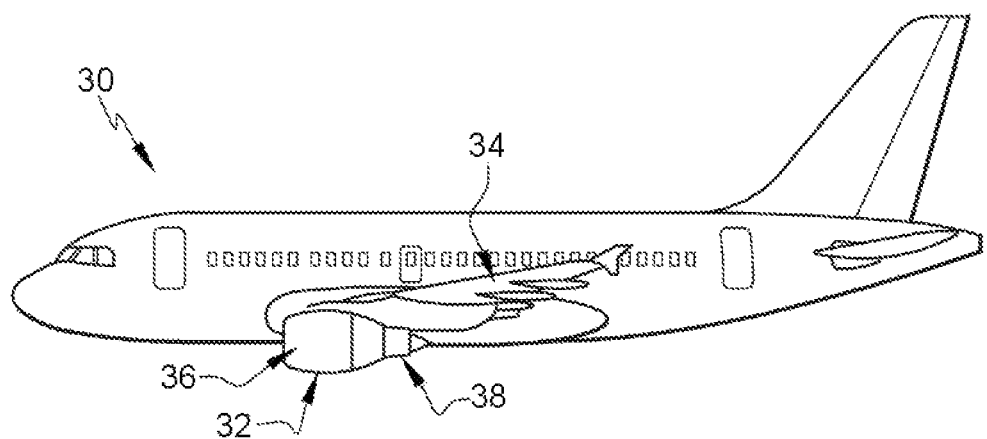
FIG. 4 is a side view of an aircraft.

FIG. 4 depicts an aircraft 30 having propulsion units 32 fixed underneath its wings 34. Each propulsion unit 32 comprises a nacelle 36 and a turbomachine 38 positioned inside the nacelle 36.

Figure 5:
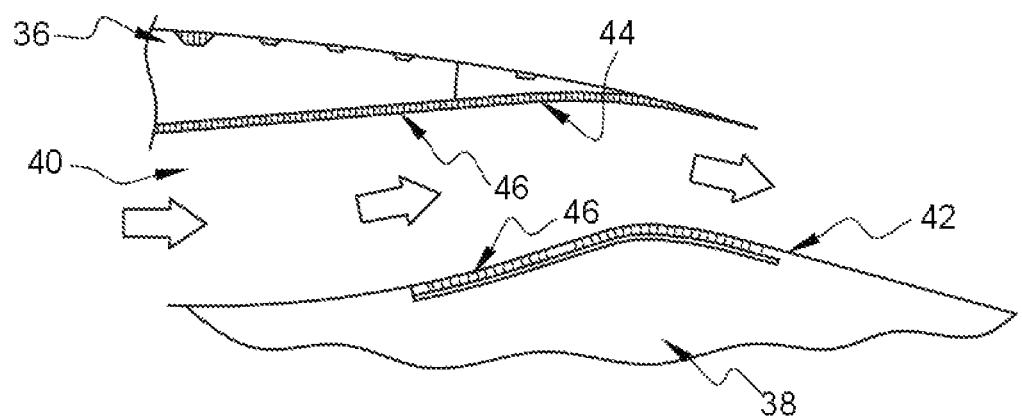
FIG. 5 is a perspective view of a primary exhaust duct comprising at least one acoustic absorption coating which illustrates one application of the invention.

According to an embodiment which can be seen in FIG. 5, the propulsion unit 32 comprises a secondary exhaust duct 40, channeling a secondary flow of air, which is delimited by an inner wall 42 (also referred to as IFS for "inner fixed structure") and by an outer wall 44 (also referred to as OFS for "outer fixed structure").

According to one configuration, the inner wall 42 or the outer wall 44 comprises an acoustic absorption coating 46 (also referred to as acoustic panel).

Although it has been described as applying to a secondary exhaust duct 40, the invention is not limited to this application. Thus, the acoustic absorption coating 46 can be positioned on any surface in contact with a medium in which sound waves propagate during operation, such as a lip and an air inlet duct of an aircraft nacelle, a fan casing of an aircraft nacelle or any other surface of the propulsion unit 32, for example. Irrespective of the configuration, the aircraft 30, and more particularly one of its propulsion units 32, comprises at least one acoustic absorption coating 46.

Figure 6:
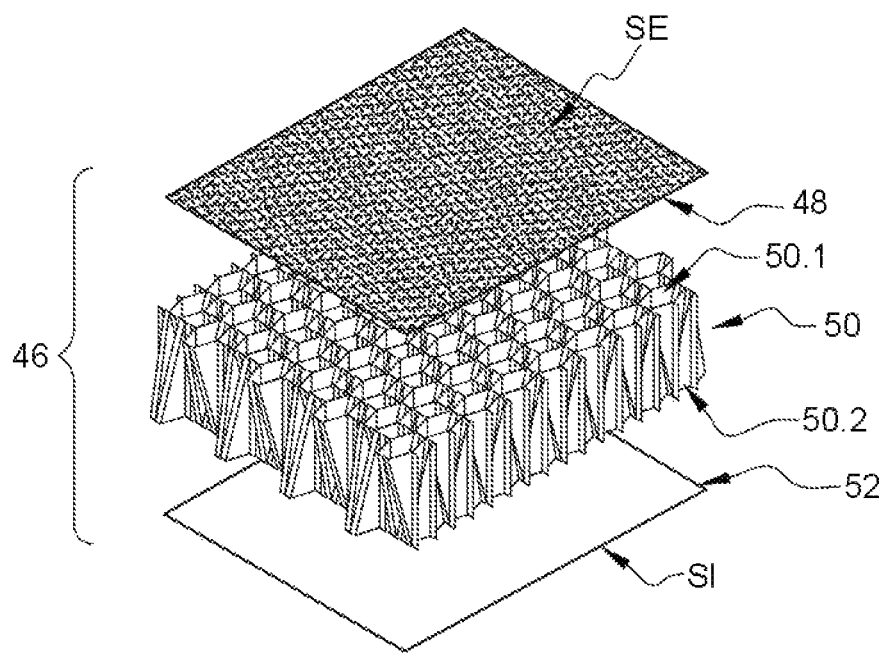
FIG. 6 is a perspective view of an acoustic absorption coating illustrating an embodiment of the invention.

According to an embodiment that can be seen in FIG. 6, the acoustic absorption coating 46 has an outer surface SE in contact with a medium in which sound waves propagate during operation, and an inner surface SI opposite to the outer surface SE. The acoustic absorption coating 46 comprises, from the outer layer SE to the inner layer SI, a porous layer 48 (also referred to as resistive layer), one face of which forms the outer surface SE, at least one cellular structure 50, and also a reflective layer 52, one face of which forms the inner surface SI. Thus, the porous layer 48 is held against a first face 50.1 of the cellular structure 50 and the reflective layer 52 is held against a second face 50.2 of the cellular structure 50, opposite to the first face 50.1.

For the remainder of the description, a longitudinal direction is perpendicular to the first face 50.1. A longitudinal plane contains the longitudinal direction. A transverse plane is a plane perpendicular to the longitudinal direction.

Figure 11:
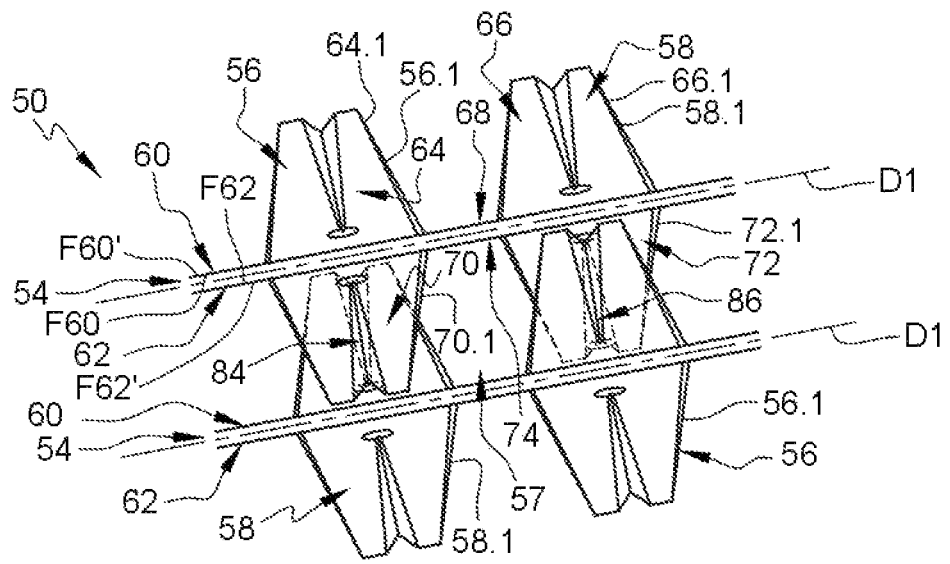
FIG. 11 is a top view of multiple rows of cells obtained from strips of material as illustrated in FIG. 7.
Figure 17:
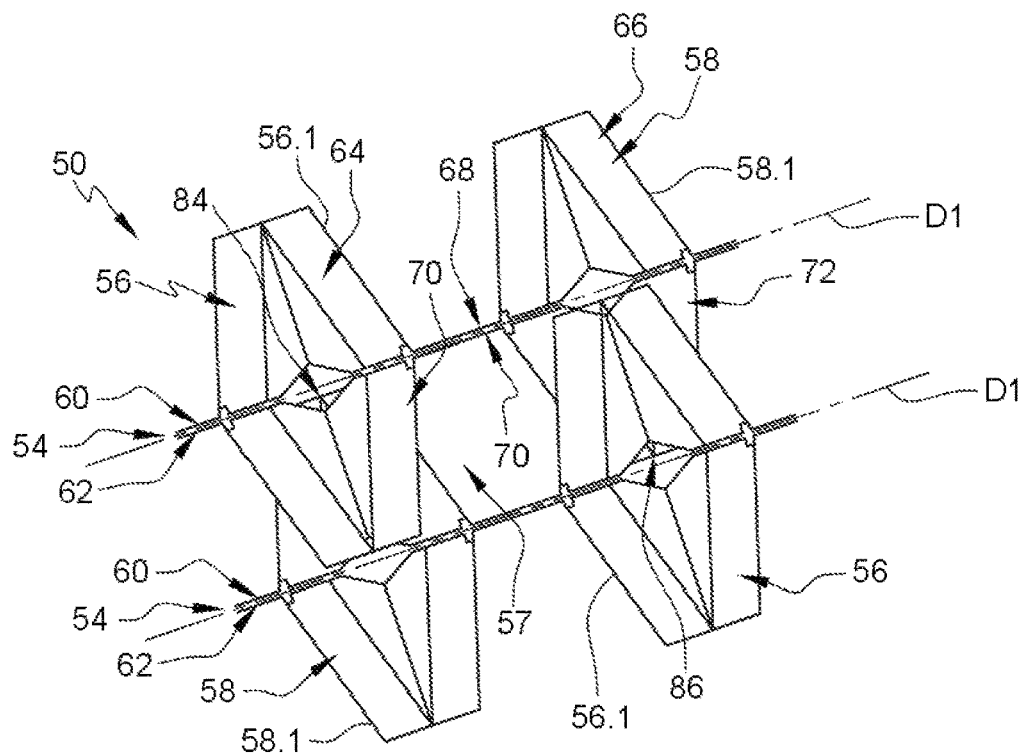
FIG. 17 is a top view of multiple rows of cells obtained from strips of material as illustrated in FIG. 12.
Figure 19:
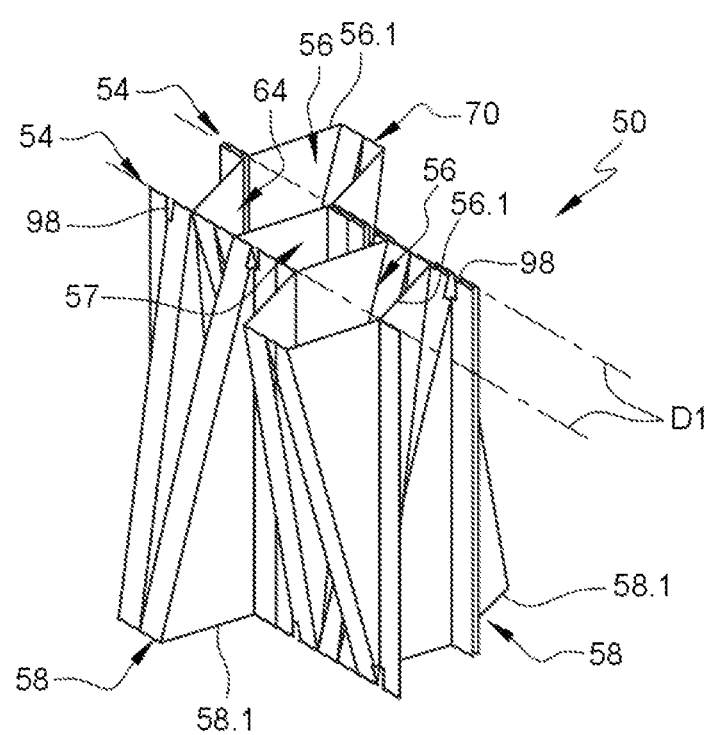
FIG. 19 is a perspective view of part of a cellular structure obtained by assembling the strips of material that can be seen in FIG. 18.

As is illustrated in FIGS. 11, 17 and 19, the cellular structure 50 comprises multiple rows of cells 54 oriented in a first direction D1 and each alternatingly having first cells 56, each of which has a first opening 56.1 opening into the first face 50.1 and a cross section that increases towards the first face 50.1, and second cells 58, each of which has a second opening 58.1 opening into the second face 50.2 and a cross section that increases towards the second face 50.2.

The first cells 56, opening into the first face 50.1 towards the porous layer 48, make it possible to attenuate the high frequencies, whereas the second cells 58, opening into the second face 50.2 towards the reflective layer 52, make it possible to attenuate the low frequencies.

Each row of cells 54 comprises first and second strips of material 60, 62 placed against one another. The first strip of material 60 comprises a first internal face F60 oriented towards the second strip of material 62 and a first external face F60' opposite to the first internal face F60. The first strip of material 60 likewise comprises first and second mutually parallel longitudinal sides 60.1, 60.2, the first and second longitudinal sides 60.1, 60.2 being positioned on the first and second faces 50.1, 50.2, respectively.

In parallel, the second strip of material 62 comprises a second internal face F62 oriented towards the first strip of material 60 and a second external face F62' opposite to the second internal face F62. The second strip of material 62 likewise comprises first and second mutually parallel longitudinal sides 62.1, 62.2, the first and second longitudinal sides 62.1, 62.2 being positioned on the first and second faces 50.1, 50.2, respectively.

Each first strip of material 60 comprises first recessed shapes 64, second recessed shapes 66, and joining zones 68 separating the first and second recessed shapes 64, 66, the first and second recessed shapes 64, 66 alternating. The joining zones 68 are coplanar and positioned in a reference plane. Each first recessed shape 64 comprises a first edge 64.1 positioned on the first longitudinal side 60.1, spaced apart from the reference plane, forming a first half of the first opening 56.1 of a first cell 56. Each second recessed shape 66 comprises a second edge 66.1 positioned at the second longitudinal side 60.2, spaced apart from the reference plane, forming a first half of the second opening 58.1 of a second cell 58.

Each second strip of material 62 comprises first recessed shapes 70, second recessed shapes 72, and joining zones 74 separating the first and second recessed shapes 70, 72, the first and second recessed shapes 70, 72 alternating. The joining zones 74 are coplanar and positioned in a reference plane. Each first recessed shape 70 comprises a first edge 70.1 positioned at the first longitudinal side 60.1, spaced apart from the reference plane, forming a second half of the first opening 56.1 of a first cell 56. Each second recessed shape 72 comprises a second edge 72.1 positioned at the second longitudinal side 60.2, spaced apart from the reference plane, forming a second half of the second opening 58.1 of a second cell 58.

To obtain a row of cells 54, the first and second strips of material 60, 62 are placed against one another by connecting their joining zones 68, 74 by adhesive bonding, welding or any other assembly technique. To that end, the first and second recessed shapes 64, 66, 70, 72 and the joining zones 68, 74 are arranged so as to form the first and second cells 56, 58 when the first and second strips of material 60, 62 are assembled.

Figure 7:
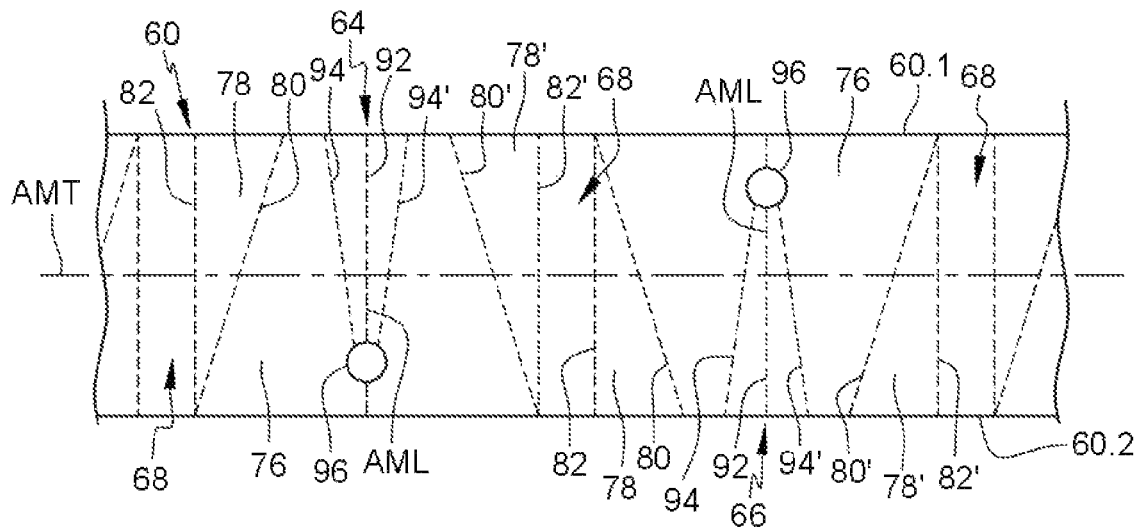
FIG. 7 is a front view of a strip of material in the flat state illustrating a first embodiment of the invention.
Figure 8:
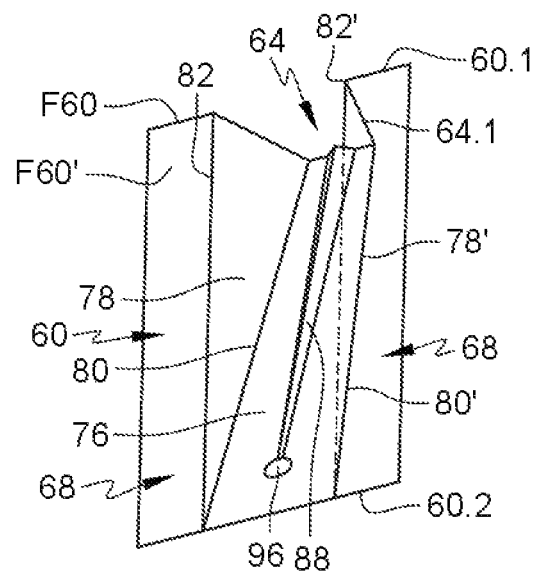
FIG. 8 is a perspective view of part of the strip of material that can be seen in FIG. 7 after bending.
Figure 9:
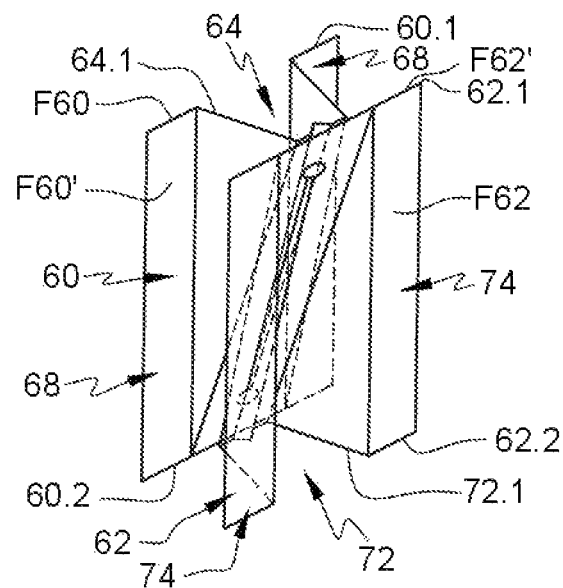
FIG. 9 is a perspective view of part of an assembly of two juxtaposed strips of material illustrating the first embodiment of the invention.
Figure 10:
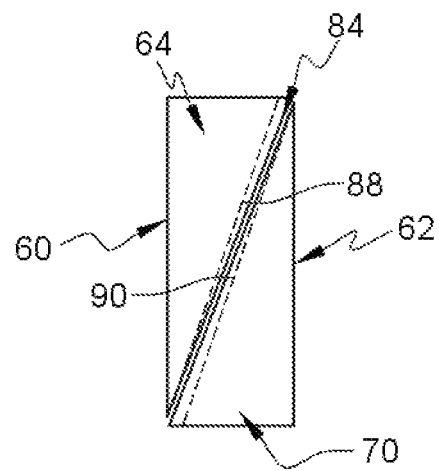
FIG. 10 is a side view of the assembly that can be seen in FIG. 9.
Figure 12:
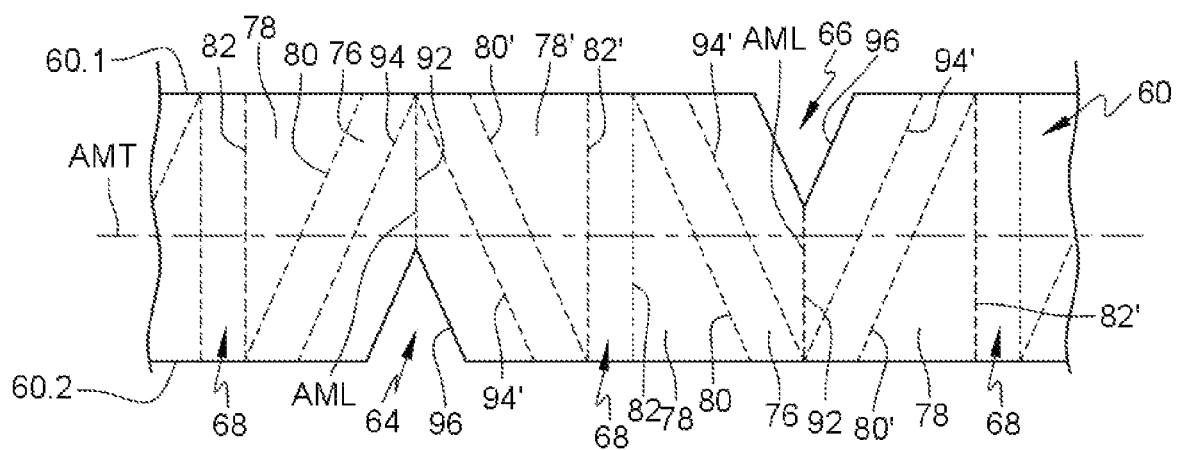
FIG. 12 is a front view of a strip of material in the flat state illustrating a second embodiment of the invention.
Figure 13:
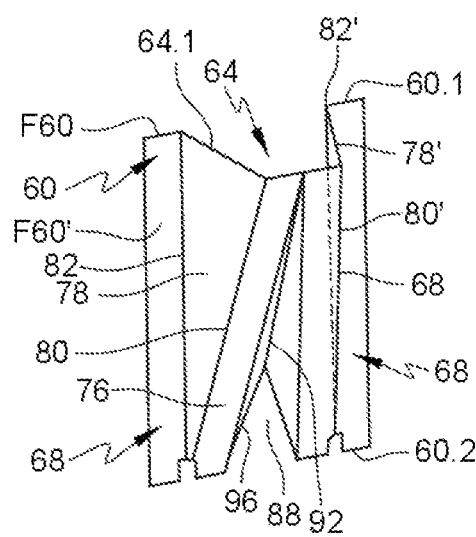
FIG. 13 is a perspective view of part of the strip of material that can be seen in FIG. 12 after bending.
Figure 14:
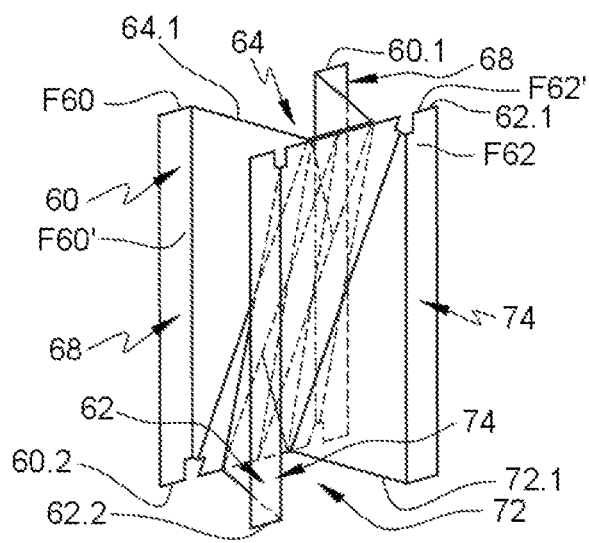
FIG. 14 is a perspective view of part of an assembly of two juxtaposed strips of material illustrating the second embodiment of the invention.
Figure 15:
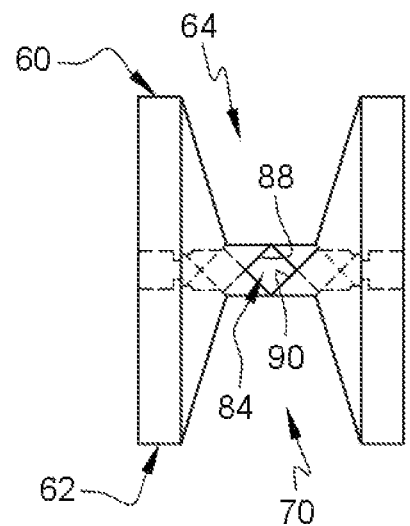
FIG. 15 is a top view of the assembly that can be seen in FIG. 14.
Figure 16:
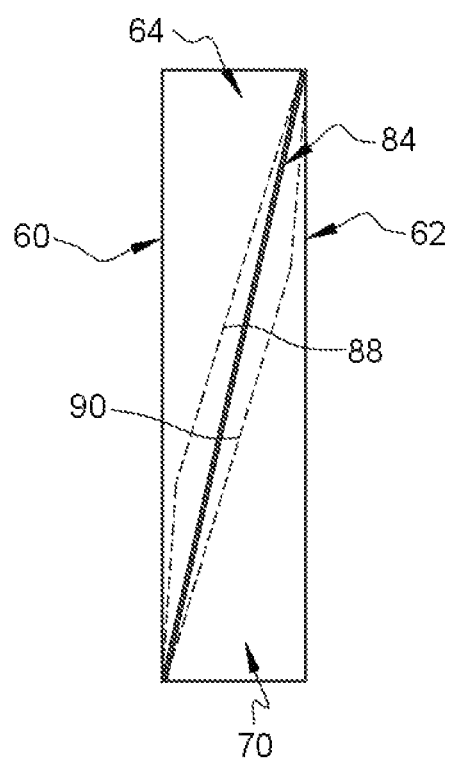
FIG. 16 is a side view of the assembly that can be seen in FIG. 14.

The first and second strips of material 60, 62 are identical. For each of the first and second strips of material 60, 62, the first recessed shapes 64, 70 and the second recessed shapes 66, 72 are symmetrical with respect to a transverse median axis AMT (visible in FIGS. 7 and 12) located equidistantly from the first and second longitudinal sides 60.1, 60.2; 62.1, 62.2 of the first and second strips of material 60, 62.

According to one feature of the invention, the first and second recessed shapes 64, 66, 70, 72 of the first and second strips of material 60, 62 are obtained by bending.

Each first or second recessed shape 64, 66, 70, 72 comprises a main face 76 and first and second triangular lateral faces 78, 78' arranged on either side of the main face 76 and connecting the main face 76 to one of the joining zones 68, 74. The main face 76 is separated from the first lateral face 78 by a first main bending line 80 and from the second lateral face 78' by a second main bending line 80'. Each joining zone 68, 74 is approximately rectangular. The first lateral face 78 is separated from a first joining zone 68, 74 by a first secondary bending line 82. The second lateral face 78' is separated from a second joining zone 68, 74 by a second secondary bending line 82'. The first and second secondary lines 82, 82' are perpendicular to the first and second longitudinal sides 60.1, 60.2, 62.1, 62.2.

For each first or second recessed shape 64, 66, 70, 72, the first and second main and secondary bending lines 80, 80', 82, 82' are symmetrical with respect to a longitudinal median axis AML equidistantly from the joining zones 68, 74.

For the first recessed shapes 64, 70 of the first and second strips of material 60, 62, the first and second lateral faces 78, 78' each comprise one side positioned at the first longitudinal sides 60.1, 62.1. For the second recessed shapes 66, 72 of the first and second strips of material 60, 62, the first and second lateral faces 78, 78' each comprise one side positioned at the second longitudinal sides 60.2, 62.2.

The rows of cells 54 are arranged such that:

The main face 76 of a first recessed shape 64 of a first strip of material 60 of a first row is held against a main face 76 of a second recessed shape 72 of a second strip of material 62 of a second row;

The main face 76 of a second recessed shape 66 of a first strip of material 60 of the first row is held against a main face 76 of a first recessed shape 70 of the second strip of material 62 of the second row.

According to one particular feature of the invention, the cellular structure 50 comprises, for each first cell 56 of a first row, a first duct 84 connecting it to a second cell 58 of a second row placed against the first cell 56, and also, for each second cell 58 of the first row, a second duct 86 connecting it to a first cell 56 of the second row placed against the second cell 58.

The first cells 56 attenuate the high frequencies, and then pass sound on to the second cells 58 which attenuate the low frequencies. The first and second cells 56, 58 thus operate together.

By contrast to the prior art, a Helmholtz resonator is not obtained by connecting a first cell and a second cell of one and the same row of cells but by connecting a first cell of a first row of cells and a second cell of a second row of cells or a second cell of the first row of cells and a first cell of the second row of cells.

According to one configuration, the first duct 84 is interposed between the main face 76 of a first recessed shape 64 of a first strip of material 60 of a first row and the main face 76 of a second recessed shape 72 of a second strip of material 62 of a second row. The second duct 86 is interposed between the main face 76 of a second recessed shape 66 of the first strip of material 60 of the first row and the main face 76 of a first recessed shape 70 of the second strip of material 62 of the second row.

According to one particular feature of the invention, each first or second duct 84, 86 comprises a first channel 88 in the first strip of material 60 and a second channel 90 in the second strip of material 62, the first and second channels 88, 90 being arranged such that they interact to form a first or second duct 84, 86 when the first and second strips of material 60, 62 are assembled.

The first and second channels 88, 90 are provided at the main faces 76 of the first and second recessed shapes 64, 66, 70, 72.

According to one particular feature of the invention, the first and second channels 88, 90 are obtained by bending.

Each first or second channel 88, 90 comprises a median bending line 92 positioned at the longitudinal median axis AML of each recessed shape 64, 66, 70, 72 and two oblique bending lines 94, 94' symmetrical with respect to the median bending line 92 and intersecting at the median bending line 92. Thus, for each first or second channel 88, 90, the median bending line 92 corresponds to the base of the first or second channel 88, 90 and the oblique bending lines 94, 94' correspond to the edges of the first or second channel 88, 90. Irrespective of the embodiment, each first or second channel 88, 90 comprises bending lines 92, 94, 94' arranged such that the first and second channels 88, 90 (of different strips of material) form a first or second duct 84, 86 positioned between two main faces 76 held against one another.

Each main face 76 comprises a cutout 96 configured to place a first or second cell 56, 58 and a first or second duct 84, 86 in communication.

According to a first embodiment that can be seen in FIGS. 7 to 11, the cutout 96 is offset with respect to the first and second longitudinal sides 60.1, 60.2; 62.1, 62.2 of the first and second strips of material 60, 62.

According to a second embodiment that can be seen in FIGS. 12 to 19, the cutout 96 intersects one longitudinal side from among the first and second longitudinal sides 60.1, 60.2; 62.1, 62.2 of the first and second strips of material 60, 62.

Multiple embodiments are conceivable for obtaining by bending the first and second recessed shapes 64, 66, 70, 72 and the first and second channels 88, 90.

According to a first embodiment that can be seen in FIGS. 7 to 11, described in terms of a first strip of material 60, the main face 76 of the first recessed shape 64 has a trapezoidal shape and has a large base positioned at the second longitudinal side 60.2 and also a small base positioned at the first longitudinal side 60.1. This main face 76 has oblique bending lines 94, 94' which are spaced apart from the median bending line 92 at the first longitudinal side 60.1 and which converge at the second longitudinal side 60.2. The cutout 96 has the shape of a disc positioned symmetrically with respect to the median bending line 92 and close to the second longitudinal side 60.2.

In addition, the main face 76 of the second recessed shape 66 has a trapezoidal shape and has a large base positioned at the first longitudinal side 60.1 and also a small base positioned at the second longitudinal side 60.2. This main face 76 has oblique bending lines 94, 94' which are spaced apart from the median bending line 92 at the second longitudinal side 60.2 and which converge at the first longitudinal side 60.1. The cutout 96 has the shape of a disc positioned on the median bending line 92 and close to the first longitudinal side 60.1.

According to this first embodiment, the first and second strips of material 60, 62 are identical.

According to a second embodiment that can be seen in FIGS. 12 to 19, described in terms of a first strip of material 60, the main face 76 of the first recessed shape 64 has a trapezoidal shape and has a large base positioned at the second longitudinal side 60.2 and also a small base positioned at the first longitudinal side 60.1. This main face 76 has oblique bending lines 94, 94' which are spaced apart from the median bending line 92 at the second longitudinal side 60.2 and which converge at the first longitudinal side 60.1. The cutout 96 has a V shape which extends from the second longitudinal side 60.2 and the two sides of which are substantially parallel to the oblique bending lines 94, 94'.

In addition, the main face 76 of the second recessed shape 66 has a trapezoidal shape and has a large base positioned at the first longitudinal side 60.1 and also a small base positioned at the second longitudinal side 60.2. This main face 76 has oblique bending lines 94, 94' which are spaced apart from the median bending line 92 at the first longitudinal side 60.1 and which converge at the second longitudinal side 60.2. The cutout 96 has a V shape which extends from the first longitudinal side 60.1 and the two sides of which are substantially parallel to the oblique bending lines 94, 94'.

Of course, the invention is not restricted to this embodiment for the first and second recessed shapes 64, 66, 70, 72. Thus, each first or second strip of material 60, 62 comprises bending lines arranged such that each first or second recessed shape 64, 66, 70, 72 comprises a main face 76 inclined with respect to the joining zones 68, 74 and such that the main faces 76 of the first strip of material 60 are held against and connected, by adhesive bonding, welding or any other assembly technique, to the main faces 76 of a second strip of material 62 when the first and second strips of material 60, 62 are assembled so as to form the cellular structure 50.

According to one configuration, at least at one longitudinal side from among the first and second longitudinal sides 60.1, 60.2; 62.1, 62.2, the first and second strips of material 60, 62 comprise notches 98 (visible in FIGS. 18 and 19), which collaborate from one strip of material to the other so as to form a drainage network.

According to one embodiment, a method for manufacturing a cellular structure 50 comprises a first step of shaping the first and second strips of material 60, 62 by bending so as to obtain the first and second recessed shapes 64, 66, 70, 72 and also the first and second channels 88, 90, and then a step of assembling the first and second strips of material 60, 62 by holding and connecting the joining zones 68 of the first strip of material 60 against the joining zones 74 of the second strip of material 62.

During this assembly step, the main faces 76 of the first recessed shapes 64 of the first strip of material 60 of a first row of cells are held against the main faces 76 of the second recessed shapes 72 of the second strip of material 62 of a second row of cells. In parallel, the main faces 76 of the second recessed shapes 66 of the first strip of material 60 of the first row are held against the main faces 76 of the first recessed shapes 70 of the second strip of material 62 of the second row.

During this assembly, the first and second channels 88, 90 are kept partially open so as to form the first and second ducts 84, 86.

Figure 18:
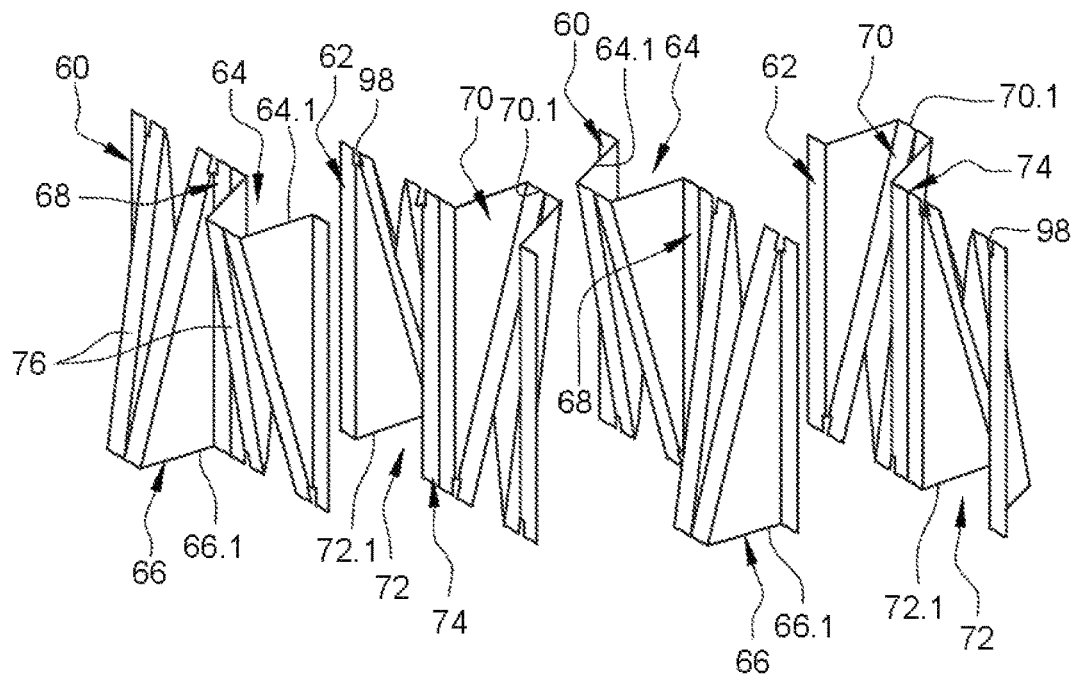
FIG. 18 is a perspective view of multiple strips of material before assembly illustrating the second embodiment of the invention.

According to one procedure, the assembly step may comprise a first sub-step of assembling each row of cells and then a second sub-step of assembling the rows of cells with one another. As a variant, these two sub-steps could be carried out at the same time, as is illustrated in FIGS. 18 and 19.

Prior to the step of shaping by bending, the method for manufacturing a cellular structure comprises a step of making cutouts 96 in the first and second strips of material in the flat state.

Irrespective of the embodiment, the first and second recessed shapes 64, 66, 70, 72 and also the first and second channels 88, 90 of the first and second strips of material 60, 62 are obtained by bending, this making it possible to expand the choice of materials and thicknesses for the first and second strips of material 60, 62.

As is illustrated in FIGS. 11, 17 and 19, third cells 57, which open both into the first face 50.1 and the second face 50.2 of the cellular structure 50, are formed between two rows of cells 54. The third cells 57 are delimited by the joining zones 68, 74 and the lateral faces 78, 78' of the recessed shapes 64, 66, 70, 72 of the first and second strips of material 60, 62. These third cells 57 make it possible to attenuate intermediate frequencies between high frequencies and low frequencies. These third cells 57 operate independently of the first and second cells 56, 58.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a cellular structure having first and second faces and also rows of cells each alternatingly comprising first cells, which are open towards the first face, and second cells, which are open towards the second face, the cellular structure likewise comprising, between each row of cells, third cells, which are open towards the first and second faces; the method for manufacturing the cellular structure comprising:

shaping first and second strips of material by bending in order to obtain, for each first and second strip of material, first and second recessed shapes and also joining zones separating the first and second recessed shapes, the pluralities of the first and second strips of material being identical, and assembling the first and second strips of material so as to form the cellular structure by holding and connecting the joining zones of the first strips of material against the joining zones of the second strips of material, the first and second recessed shapes alternating and being arranged so as to form the first and second cells and also the third cells, and wherein, during the step of shaping by bending of the first and second strips of material, each first strip of material is shaped by bending so as to also obtain a first channel and each second strip of material is shaped by bending so as to also obtain a second channel, the first and second channels forming ducts, each of which connects a pair of the first cells and the second cells.

2. The method for manufacturing a cellular structure according to claim 1, wherein each first and second strip of material of the pluralities of first and second strips of material comprises main bending lines arranged such that each first and second recessed shape comprises a main face separated from first and second triangular lateral faces, said first and second triangular lateral faces being arranged on either side of the main face, and also secondary bending lines arranged such that each first and second triangular lateral face is separated from one of the joining zones, the main face being inclined with respect to the joining zones and such that, during the assembling step, the main face of each first strip of material of the plurality of first strips of material is held against and connected to the main faces of one of the second strips of material of the plurality of second strips of material.

3. The method for manufacturing a cellular structure according to claim 2, wherein, for each first and second recessed shape, the main bending lines and secondary bending lines are symmetrical with respect to a longitudinal median axis equidistant from the joining zones arranged on either side of the first and second recessed shapes.

4. The method for manufacturing a cellular structure according to claim 2, wherein the first and second channels are positioned in the main faces of the first and second recessed shapes and each comprise first bending lines arranged such that each pair of first and second channels forms one of the ducts positioned between two main faces held against one another.

5. The method for manufacturing a cellular structure according to claim 4, wherein each first and second channel comprises a median bending line of the first bending lines and also two oblique bending lines of the first bending lines symmetrical with respect to the median bending line and intersecting at the median bending line.

6. The method for manufacturing a cellular structure according to claim 2, further comprising a step of making a cutout in the main face of each first and second recessed shape of each first and second strip of material of the pluralities of first and second strips of material in a flat state prior to the step of shaping by bending, each cutout being configured to place the first or second cell of the plurality of the first and second cells and one of the ducts in communication.

7. The method for manufacturing a cellular structure according to claim 6, wherein each first and second strip of material of the plurality of first and second strips of material comprises first and second longitudinal sides, each cutout being offset with respect to the first and second longitudinal sides of the first and second strips of material of the plurality of first and second strips of material.

8. The method for manufacturing a cellular structure according to claim 6, wherein each first and second strip of material of the plurality of first and second strips of material comprises first and second longitudinal sides, each cutout intersecting one longitudinal side from among the first and second longitudinal sides of the first and second strips of material of the plurality of first and second strips of material.

\* \* \* \* \*